United States Patent
Lin et al.

(10) Patent No.: US 8,164,575 B2
(45) Date of Patent: Apr. 24, 2012

(54) METHOD FOR IDENTIFYING A SINGLE TAP, DOUBLE TAPS AND A DRAG AND A CONTROLLER FOR A TOUCH DEVICE EMPLOYING THE METHOD

(75) Inventors: Jao-Ching Lin, Taipei (TW); Lin-Abel Chu, Taipei (TW); Yen-Fu Liu, Taipei (TW); Chung-Yi Shen, Taipei (TW)

(73) Assignee: Sentelic Corporation, Taipei (TW)

( * ) Notice: Subject to any disclaimer, the term of this patent is extended or adjusted under 35 U.S.C. 154(b) by 803 days.

(21) Appl. No.: 12/143,028

(22) Filed: Jun. 20, 2008

(65) Prior Publication Data

US 2009/0315826 A1    Dec. 24, 2009

(51) Int. Cl.
*G06F 3/041* (2006.01)
(52) U.S. Cl. ...... 345/173; 345/156; 345/157; 178/18.01
(58) Field of Classification Search .......... 345/156–177; 178/18.01–18.09
See application file for complete search history.

(56) References Cited

U.S. PATENT DOCUMENTS 5,543,591 A * 8/1996 Gillespie et al. ........... 178/18.03
6,278,888 B1 * 8/2001 Hayes et al. ................. 455/566

* cited by examiner

*Primary Examiner* — Amare Mengistu
*Assistant Examiner* — Koosha Sharifi-Tafreshi
(74) *Attorney, Agent, or Firm* — Winston Hsu; Scott Margo

(57) ABSTRACT

A method for identifying a single tap with a controller employing the method comprises following steps: (a) detecting the first hit-movement being conducted by the object touching the touch device; (b) starting a time-counting if a detected result of step (a) is "YES"; (c) detecting if the object leaves the touch device within the first reference time interval; (d) generating an operation signal to represent a start of the hit-movement at the time of the first reference time interval ending if a detected result of step (c) is "YES"; (e) detecting if the second hit-movement is conducted by the object touching the touch device within a second reference time interval after the first reference time interval; (f) maintaining the operation signal to represent the second hit-movement being conducted if a detected result of step (e) is "YES"; and (g) terminating said operation signal at the time of the second reference time interval ending to represent a cease of the second hit-movement if a detected result of said step (e) is "NO" for completing the single tap.

6 Claims, 7 Drawing Sheets

METHOD FOR IDENTIFYING A SINGLE TAP, DOUBLE TAPS AND A DRAG AND A CONTROLLER FOR A TOUCH DEVICE EMPLOYING THE METHOD

BACKGROUND OF THE INVENTION

1. Field of the Invention

The present invention is related to a method and controller for identifying a movement simulating the button keys of a mouse and particularly to a method for identifying a single tap, double taps and a drag and a controller of a touch device employing the method.

2. Brief Description of the Related Art

The Graphical User Interface (GUI), which is a program operation interface developed by PARC research lab of ZEROX CO., can work with a pointing device such as the mouse. An action desired by a user is performed easily by means of a pointer type mouse with the button key on the mouse being clicked to overcome the inconvenience resulting from the conventional character mode which is required to input complicated instructions. Hence, the GUI has been adopted by Apple Computer Co. and Microsoft Co., respectively, and has become a mainstream mode in all the operation systems. Therefore, it is essential that the electronic equipment such as the desktop computer, the laptop computer, the tablet computer, the personal digital assistant (PDA) and etc. adapted with the GUI provides the pointing device.

The currently available pointing devices are the mouse which is externally disposed, the locus ball and the touch panel which are built in the portable computer system respectively, and the touch panel which is associated with the screen. The mouse is the earliest developed pointing device and, hereinafter, it is taken as an example to explain the function of the pointing device. The mouse is capable of controlling the pointer on the screen of the electronic device, i.e., the pointer moves in accordance with the mouse. Then, the executed target on the screen is pointed with mouse and the control key is pressed by the user to instruct the electronic device to carry out a certain function. However, the electronic equipment is currently designed to pursue smallness, shortness, lightness and thinness. For instance, the laptop computer has replaced the desktop computer gradually such that the small sized touch device such as the touch panel becoming the most popular pointing device is a trend in the near future.

The touch device can he classified into the capacitance type, resistance type, electromagnet type, pressure type, inductance type, surface sound wave type, supersonic types and optics type based on the applied techniques. When an object such as the finger moves on the touch device, the pointer is controlled to move along with the moving direction of the object. In addition, the pointing device has a function of instructing an execution.

The operation of the mouse is explained hereinafter. When the pointer moves to a target such as a program or a document which is going to be started, a single clicking a button key (the default button key is the left key) is capable of selecting the target, and double clicking the button key is capable of selecting and starting the target. Further, when the button key is kept pressing together with the mouse being moved at the same time, the target is dragged to another spot. Nevertheless, it is possible to define a specific gesture of the object on the touch device to perform the same purpose as the preceding operation of the mouse.

Referring to FIGS. 1A-1C, U.S. Pat. No. 6,380,931 entitled "OBJECT POSITION DETECTOR WITH EDGE MOTION FEATURE AND GESTURE RECOGNITION" and U.S. Pat. No. 6,414,671 entitled "OBJECT POSITION DETECTOR WITH DEGE MOTION FEATURE AND GESTURE RECOGNITION" disclose the touch device simulating movements such as a single tap, double taps and a drag respectively. Multiple timers are added to calculate a plurality of time intervals during an object on the touch device, and the single tap, double taps and drag are figured out via the time intervals. It is learned that the process of single tap shown in FIG. 1A provides a time interval $T_{down}$ which has to be smaller than the first maximum reference time interval $T_{max\_1}$. Then, the process of double taps shown in FIG. 1B provides a time interval $T_{down}$ which has to be smaller than the first maximum reference time interval $T_{max\_1}$, a time interval $T_{up-1}$ which has to be smaller than the second maximum $T_{max-2}$ and a time interval $T_{down-2}$ which has to be smaller than the third maximum reference time interval $T_{max-3}$. Further, the process of drag shown in FIG. 1C provides a time interval $T_{down}$ which has to be smaller than the first maximum reference time interval $T_{max\_1}$, and a time interval $T_{up-1}$ which has to be smaller than the second maximum $T_{max-2}$. The preceding prior art is extremely complicated due to different combinations of the time intervals and sophisticate correlations between the time intervals such that the setup cost for the logic circuit becomes higher. Besides, it is easy for the preceding prior art to determine the movement of the object on the touch device erroneously because the respective time interval of the double taps and the drag operated by different users is somewhat different from each other.

Referring to FIGS. 2A-2C, U.S. Pat. No. 7,180,506 entitled "METHOD FOR IDENTIFYING A MOVEMENT OF SINGLE TAP ON A TOUCH DEVICE". U.S. Pat. No. 7,190,356 entitled "METHOD AND CONTROLLER FOR IDENTIFYING DOUBLE TAP GESTURES" and U.S. Pat. No. 7,184,031 ENTITLED "METHOD AND CONTROLLER FOR IDENTIFYING A DRAG GESTURE" disclose a detecting time interval $T_{detect}$ and the start and the cease of the wave shape of a touch signal is analyzed to generate corresponding operation signals for representing the single tap, the double taps and the drag respectively. The detecting time interval $T_{detect}$ keeps the same time-duration. The instant prior art has overcome the deficiency of the prior art described in the last paragraph and provides easier way for determining the movement of the object on the touch device. However, the method of the instant prior art is incapable of responding the operation of the user due to the single tap, double taps and the drag being identified after the detecting time interval $T_{detect}$.

As the foregoing, in order to improve the responding time while identifying the single tap, the double taps and the drag under a condition of keeping the simpler determination way for lowering the setup cost of the logic circuit is a subject worth to breakthrough.

SUMMARY OF THE INVENTION

Accordingly, a primary object of the present invention is to provide a method for identifying a single tap.

A method for identifying a single tap during an object contacting a touch device according to the primary object of the present invention comprises the following steps: (a) detecting if a first hit-movement is conducted by the object to touch the touch device; (b) starting a time-counting for the first reference time interval from the beginning of the first hit-movement, and continuing the time-counting for the second reference time interval from the end of the first hit-movement if a detected result of step (a) is "YES"; (c) detecting if the first hit-movement leaves the touch device within a first reference time interval; (d) generating an operation signal at the end of the first reference time interval corresponding to the touch and the leave of the first hit-movement if a detected result of step (c) is "YES"; (e) detecting if a second hit-movement is conducted by the object to touch the touch device within the second reference time interval after said the reference time interval, and maintaining the operation signal during the second reference time interval and (f) terminating the operation signal at the end of the second reference time interval, and completing the single tap if a detected result of step (e) is "NO".

Next, the second object of the present invention is to provide a controller for a touch device.

A controller, which is capable of identifying a single tap of an object on a touch device, according to the second object of the present invention comprises: a touch-detect unit for detecting a first hit-movement and a second hit-movement conducted by the object to touch and leave the touch device respectively; a gesture-operation unit, which connects with the touch-detect unit, further comprises a built-in identifying logic which utilizes a first reference time interval and a second reference time interval; a time unit being connected to the gesture-operation unit to count the first reference time interval from the beginning of the first hit-movement and then to count the second reference time interval from the end of the first reference time interval; wherein the gesture-operation unit generates an operation signal at the end of the first reference time interval corresponding to the touch signal and the leave signal when the first hit-movement occurs within the first reference time interval, maintains the operation signal during the second reference time interval, and terminates the operation signal at the end of the second reference time interval when the second hit-movement does not occur within the second reference time interval.

Further, the third object of the present invention is to provide a method for identifying double taps.

A method for identifying double taps during an object contacting a touch device according to the third object of present invention comprises following steps: (a) detecting if the touch device is touched by a first hit-movement of the object (b) starting a time-counting for a first reference time interval from the beginning of the first hit-movement, and continuing the time-counting for a second reference time interval from the end of the first reference time interval if a detected result of step (a) is "YES"; (c) detecting if the first hit-movement leaves the touch device within the first reference time interval; (d) generating a first operation signal from the end of the first reference time interval if a detected result of step (c) is "YES"; (e) detecting if a second hit-movement conducted by the object to touch and then leave the touch device within the second reference time interval; (f) terminating the first operation signal at the end of the second reference time interval if a detected result of step (e) is "YES"; and (g) generating a second operation signal and then terminating the second operation signal corresponding to the touch and the leave of the second hit-movement for completing the double taps.

Further, the fourth object of the present invention is to provide a controller of a touch device.

A controller, which is capable of identifying double taps of an object on a touch device, according to the fourth object of the present invention comprises: a touch-detect unit for detecting a first hit-movement and a second hit-movement conducted by the object to touch and leave the touch device respectively; a gesture-operation unit, which connects with the touch-detect unit, further comprises a built-in identifying logic which utilizes a first reference time interval and a second reference time interval; a time unit being connected to the gesture-operation unit to count the first reference time interval from the beginning of the first time interval, and count the second reference time interval from the end of the first time interval; wherein the gesture-operation unit generates a first operation signal from the end of the first reference time interval when the first hit-movement occurs within the first reference time interval, terminates the first operation signal at the end of the second reference time interval corresponding to the leave of the first hit-movement when the second hit-movement touches and then leaves the touch device within the second reference time interval, and generates and terminates a second operation signal corresponding to the beginning and the end of the second hit-movement respectively for completing the double taps.

Further, the fifth object of the present invention is to provide a method for identifying a drag.

A method for identifying a drag according to the fifth object of the present invention comprises following steps: (a) detecting if a first hit-movement is conducted by the object to touch the touch device; (b) starting a time-counting for a first reference time interval from the beginning of the first hit-movement and continuing the time-counting for a second reference time interval if a detected result of step (a) is "YES"; (c) detecting if the first hit-movement leaves the touch device within the first reference time interval; (d) generating a first operation signal corresponding to the touch and the leave at the end of the first reference time interval if a detected result of step (c) is "YES"; (e) detecting if a second hit-movement is conducted by the object to touch and then leave the touch device within the second reference time interval after the first reference time interval; and (f) generating a second operation signal from the end of the second reference time interval continuously till the second hit-movement stopping for completing the drag.

Further, the sixth object of the present invention is to provide a controller for a touch device.

A controller, which is capable of identifying a drag of an object on a touch device, according to the sixth object of the present invention comprises: a touch-detect unit detecting if a first hit-movement and a second hit-movement are conducted by the object to touch and leave the touch device and a gesture-operation unit, which connects with the touch-detect unit, further comprises a built-in identifying logic which utilizes a first reference time interval and a second reference time interval; a time unit is connected to-the gesture-operation unit to count the first reference time interval at the beginning of the first hit-movement and then to count the second reference time interval at the end of the first reference time interval; wherein the gesture-operation unit generates a first operation signal at the end of the first reference time interval corresponding to the touch and the leave when the first hit-movement occurs within the first reference time interval, determines if the second hit-movement occurs within the second reference time without leaving the touch device, and generates a second operation signal continuously from the end of the second reference time interval till the second hit-movement stopping for completing the drag.

In short, the effect of a method for identifying a single tap, double taps and a drag according to the present invention is capable of improving the responding time while identifying the single tap, the double taps and the drag and keeping the simpler determination way for lowering the setup cost of the logic circuit.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 4:
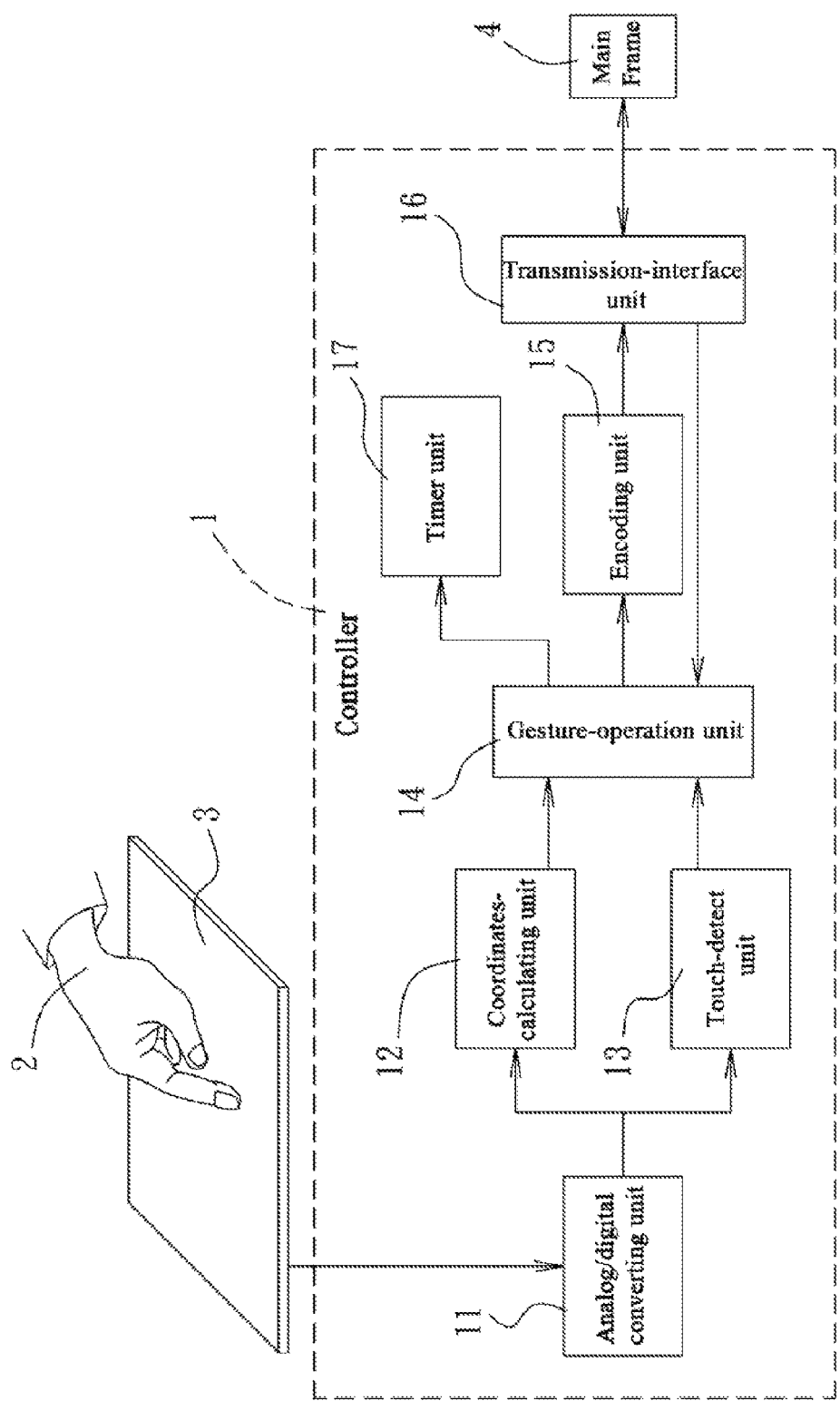
FIG. 4 is a block diagram illustrating a controller for a touch device according to the present invention.

Referring to FIG. 4, a controller 1 for a single tap, double taps and a drag in accordance with the preferred embodiment of the present invention is illustrated and the controller 1 is suitable for being installed in an electronic equipment containing a touch device 3 to recognize a movement of an object 2 on the touch device such that an operation signal corresponding to the movement can be transmitted to a main frame 4. It is noted that the touch device 3 is generally referred to the capacitance touch device, inductance touch device or the like. Specifically, the touch device employed in the preferred embodiment is the capacitance type touch device.

The object 2 is used for contacting the touch device 3, that is, movements of the object 2 on the touch device 3 induce the controller 1 to emit operation signals which correspond to the movements to the main frame 4. Generally, the operation signals are relating to changes of coordinates, a single tap, double taps, a drag, a move, a scrolling, a left key, a right key, a middle key, and etc. to further simulate the behaviors of the mouse and the keyboard. Of course, the object 2 and the touch device 3 are required to correspond to each other. For instance, the touch device 3 is a capacitance type touch device and the object 2 should be a conductor such as a finger of the human.

The main frame 4 can be an electronic device such as a desktop computer, a laptop computer, a tablet computer, a personal digital assistant (PDA), a cell phone, a remote control or any input devices capable of adapting to the touch device 3.

A preferred embodiment of the controller 1 includes an analog/digital converting unit 11, a coordinates-calculating unit 12, a touch-detect unit 13, a gesture-operation unit 14, an encoding unit 15, a transmission-interface unit 16 and a timer unit 17.

Due to multiple conductor lines being distributed along X-axis and Y-axis of the touch device 3, a capacitance change is generated on the touch device 3 at the time of the object 2 touching the touch device 3. Hence, the voltage change can be measured and values such as coordinates can be figured out correspondingly.

The analog/digital converting unit 11 is connected to the touch device 3 to convert different voltages into corresponding digital signals for further processing. The coordinates-calculating unit 12 receives the digital signals from the analog/digital converting unit 11 and decodes the digital signals as the absolute coordinates (X,Y) corresponding to the digital signals.

Figure 5:
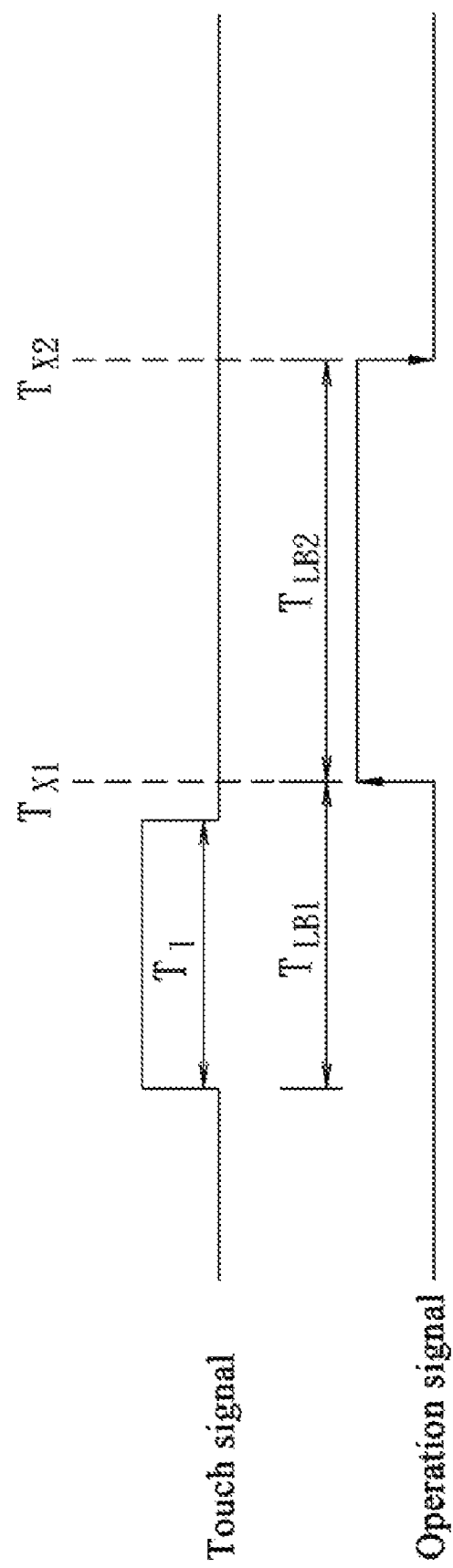
FIG. 5 is a graph of timing sequence illustrating that the method for identifying a single tap in accordance with the preferred embodiment is based on the operation signal being generated corresponding to the single tap.
Figure 6:
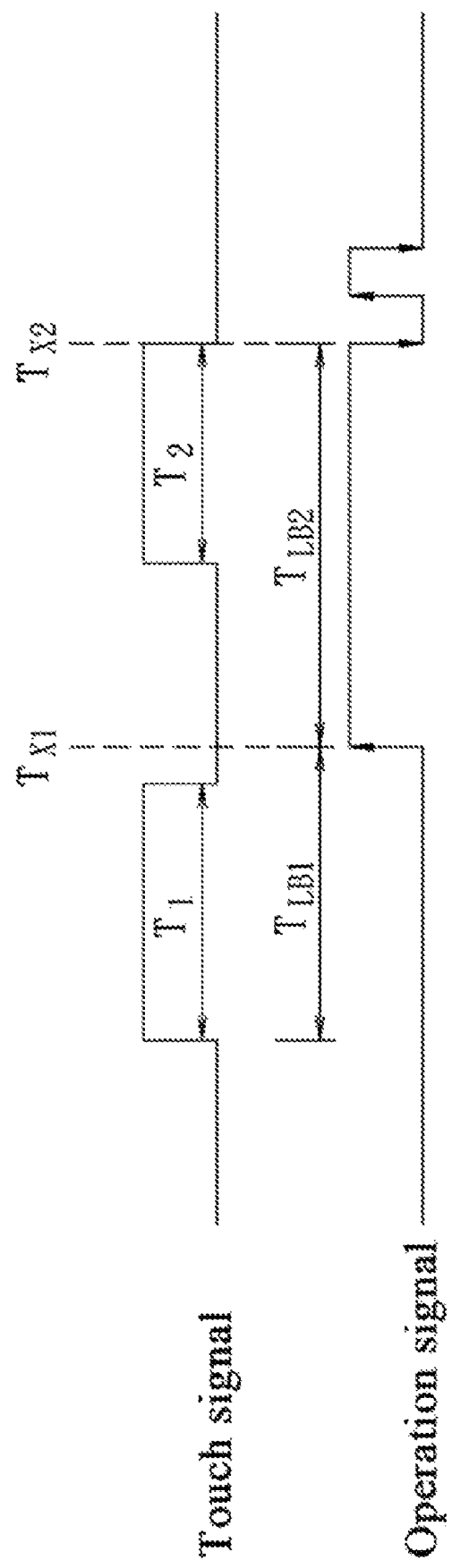
FIG. 6 is a timing sequence graph illustrating that the method for identifying double taps in accordance with the preferred embodiment is based on the operation signal being generated corresponding to the double taps.
Figure 7:
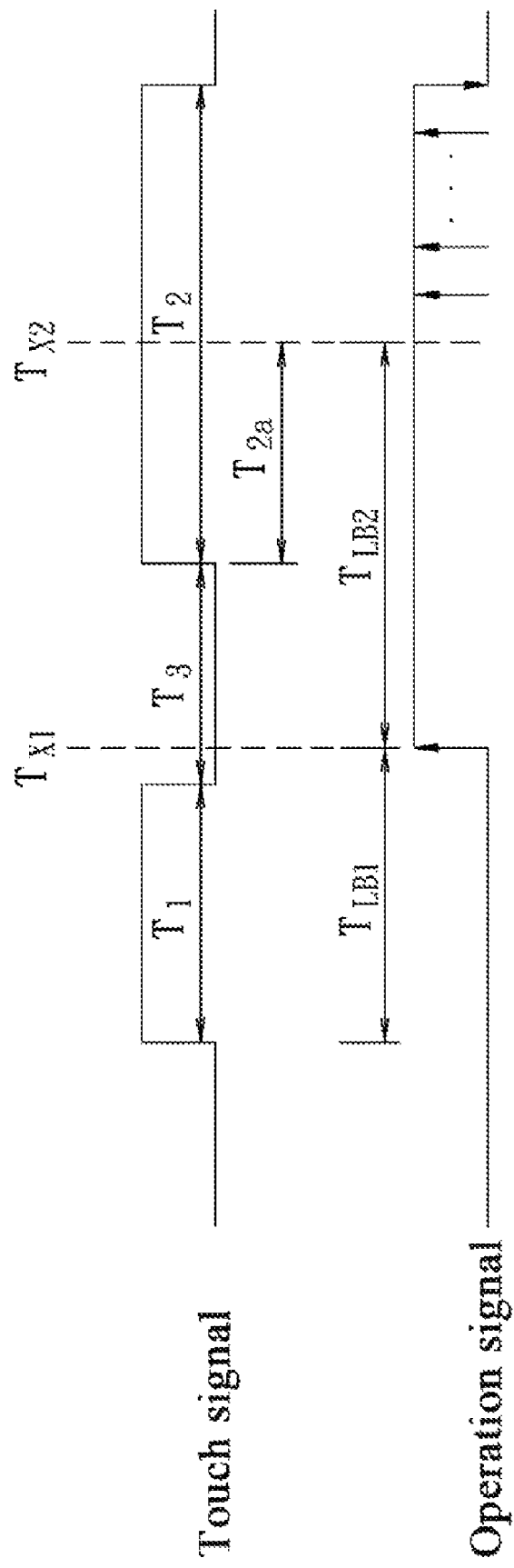
FIG. 7 is a graph of timing sequence illustrating that the method for identifying a drag in accordance with the present invention is based on the operation signal being generated corresponding to the drag.

The touch-detect unit 13 is capable of detecting if the touch device 3 is pressed by the object 2 instantly, i.e., the touch-detect unit 13 can detect where the object 2 contacting the touch device 3 according to the X and Y voltage signals transmitted by the touch device 3 and then produces a corresponding touch-signal. In other words, the touch-detect unit 13 generates the touch-signal which is the wave of the first time interval $T_1$ as shown in FIG. 5 or the respective wave of the second time interval $T_2$ as shown in FIGS. 6 and 7 during detecting if the touch device 3 is pressed. That is, changes of the wave shapes of the first and second time intervals $T_1$, $T_2$ are figured out instead of the lengths of durations of the first and second time intervals $T_1$, $T_2$. In addition, the low pass filter and algorithm are applied to avoid operation of the touch-detect unit 13 being interfered with noise.

The gesture-operation unit 14 is connected to both of the coordinates-calculating unit 12 and the touch-detect unit 13 to determine if the movements of the object 2 meet the criteria of a single tap, double taps, or a drag based on the result detected by the touch-detect unit 13 in association with a built-in identifying logic. The identifying logic utilizes a first reference time interval $T_{LB1}$ and a second reference time interval $T_{LB2}$ shown in FIG. 5 with timings of the start and the cease of the touch-signal. Besides, the first reference time interval $T_{LB1}$ and the second reference time interval $T_{LB2}$ are counted with the same timer and will be explained in detail hereinafter.

The gesture-operation unit 14 offers relative displacements in addition to identifying the movements, i.e., the gesture-operation unit 14 is capable of figuring out the relative displacements of the object 2 on the touch device 3 in accordance with the differences between the fore-coordinates and the after-coordinates when multiple absolute coordinates are sent to the gesture-operation unit 14. Even more, the parameters such as velocity, direction and distance can be figured out as well. As for that the absolute coordinates or the relative displacements should be sent to the main frame 4, it depends on the application need of the main frame 4.

The encoding unit 15 is connected to the gesture-operation unit 14 to receive the absolute coordinates signals, the relative displacement signals or the operation signals (the signals related to movements including a single tap, double taps and a drag). The encoding unit 15 encodes the different signals as a hand-writing input protocol or a standard mouse protocol such as the mouse standard protocol of Microsoft Co. or the PS/2 mouse standard protocol of IBM available for being processed with operation system of the main frame 4.

The transmission-interface unit 16 is used to send the encoded signals to the main frame 4 serially. Taking the desktop computer as an example, the encoded signals are transmitted to a controller of the keyboard (not shown) or to the south bridge chip (not shown) and an interrupt request can be emitted to a processor of the main frame 4. In this way, it allows the main frame 4 to acquire the required parameters such as locations of the coordinates and performed movements for further carrying out the movement of the pointer, selection of the program or execution of the program.

Figure 1A:
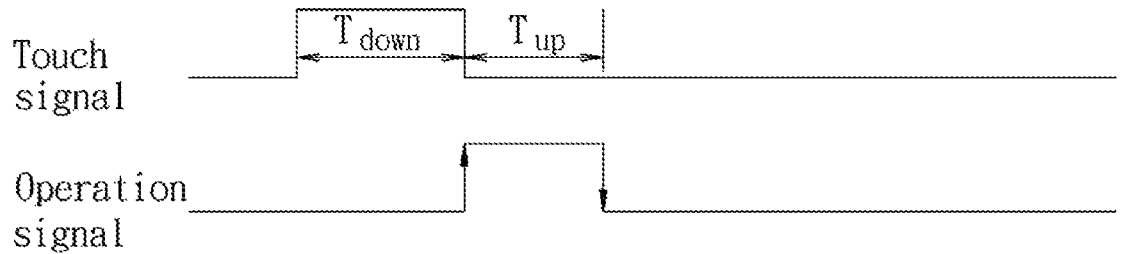
FIG. 1A is a graph of timing sequence illustrating that the conventional method for identifying a single tap is based on the operation signal being generated corresponding to the single tap.
Figure 1B:
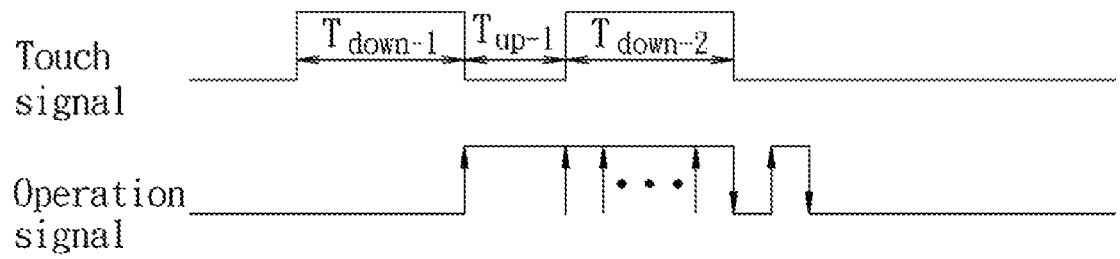
FIG. 1B is a timing sequence graph illustrating that the conventional method for identifying double taps is based on the operation signal being generated corresponding to the double taps.
Figure 1C:
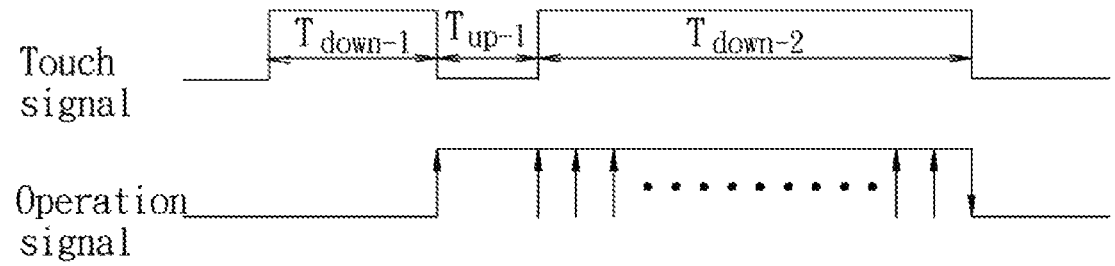
FIG. 1C is a graph of timing sequence illustrating that the conventional method for identifying a drag is based on the operation signal being generated corresponding to the drag.
Figure 2A:
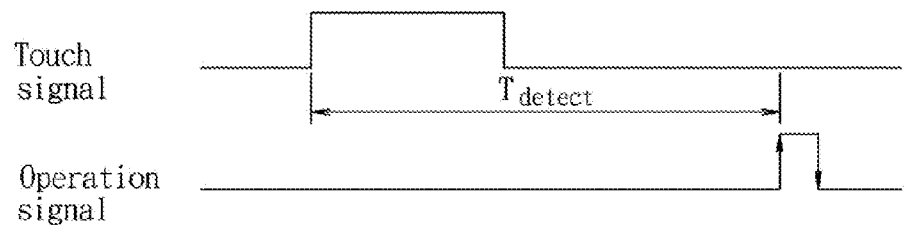
FIG. 2A is a graph of timing sequence illustrating that another conventional method for identifying a single tap is based on the operation signal being generated corresponding to the single tap.
Figure 2B:
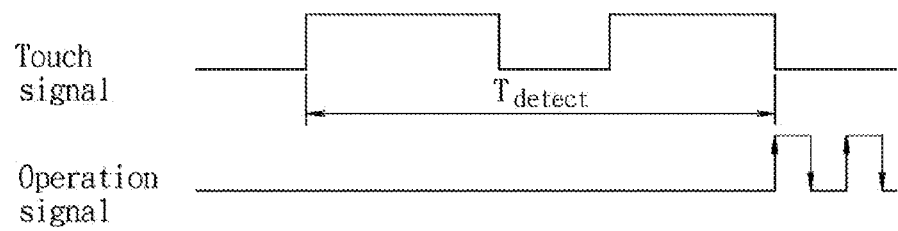
FIG. 2B is a graph of timing sequence illustrating that another conventional method for identifying double taps is based on the operation signal being generated corresponding to the double taps.
Figure 2C:
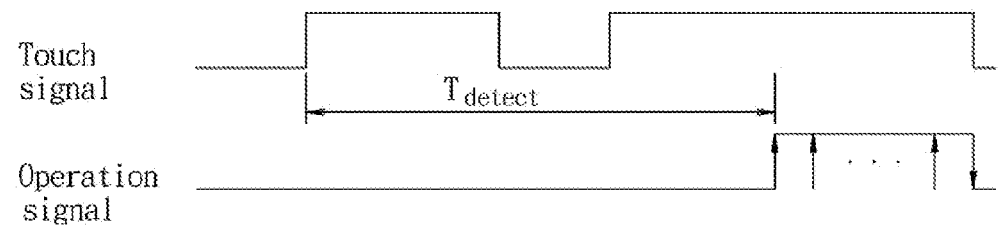
FIG. 2C is a graph of timing sequence illustrating that the conventional method for identifying a drag is based on the operation signal being generated corresponding to the drag.
Figure 3:
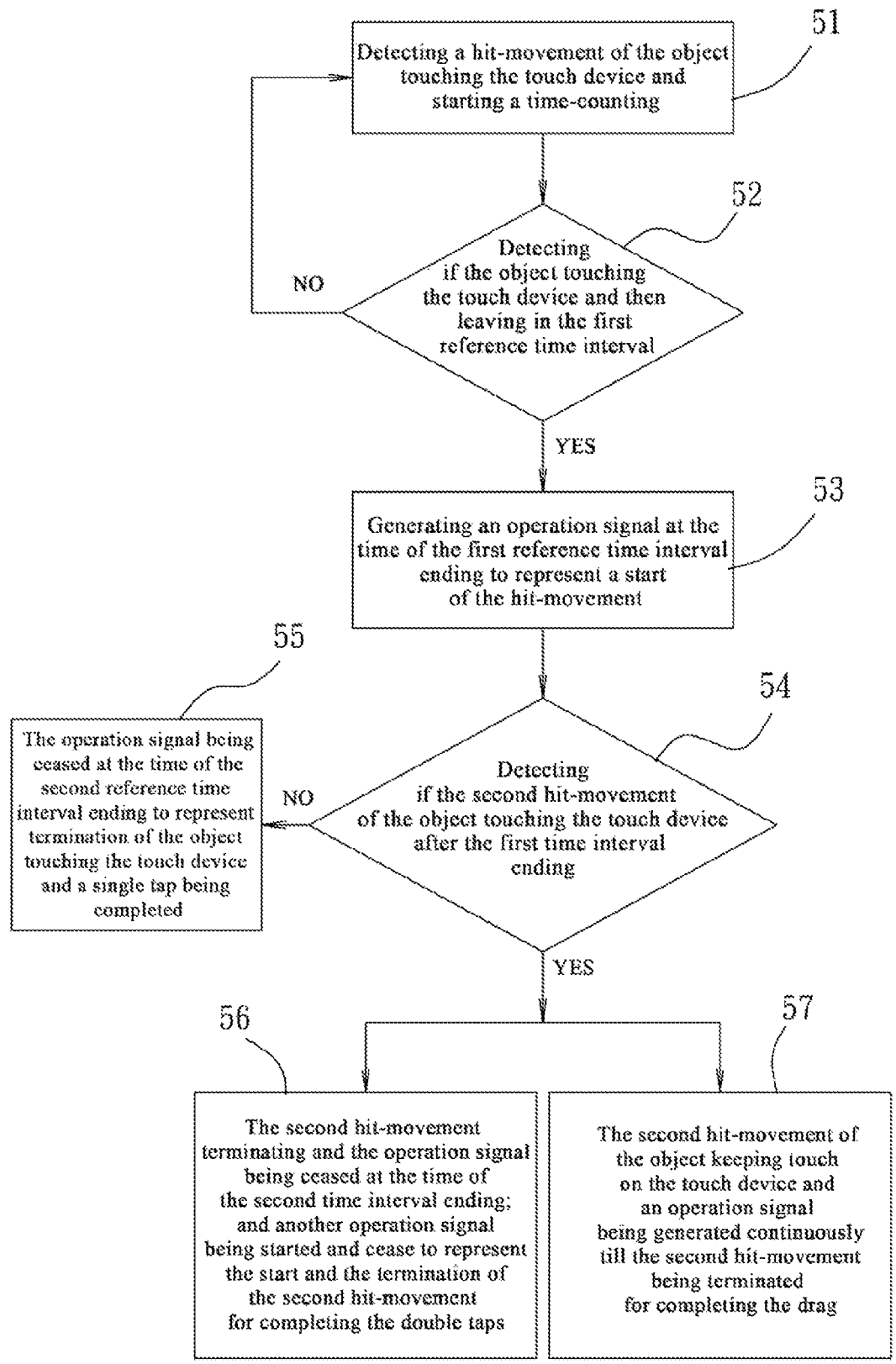
FIG. 3 is a flow chart illustrating the preferred embodiment of a method for identifying a single tap, double taps and a movement of drag according to the present invention.

Referring to FIGS. 3 and 4, a method for identifying single tap, double taps and a drag according to the present invention is suitable for the above-said controller 1 and comprises the following steps:

First of all, step 51 shows that the touch-detect unit 13 has detected a movement of the object 2 on the touch device 3 and generates a corresponding touch signal. It can be seen in FIG. 5 that the positive margin (the temperate state of the low reference level changing to the high reference level) of the wave shape of the first time interval $T_1$ in the touch signal is the initiation of contact. Meanwhile, the gesture-operation unit 14 controls the timer unit 17 to start time counting.

Next, step 52 shows that the gesture-operation unit 14 monitors if the touch-detect unit 13 has detected that the movement of the object 2 on the touch device 3 is terminated within the first reference time interval $T_{LB1}$ (the temperate state of the low reference level changing to the high reference level). If termination of the movement of the object 2 on the touch device 3 has not been detected by the touch-detect unit 13, the process is back to step 51 and the touch-detect unit 13 starts over to detect the movement of the object 2 on the touch device 3.

If the termination of the movement of the object 2 on the touch device 3 is detected by the touch-detect unit 13, then step 53 is processed and the gesture-operation unit 14 figures out the wave shape change performed by the finger within the first time interval $T_1$ via the timer unit 17 and generates a negative margin (the temperate state of the high reference level changing to the low reference level) as shown in FIG. 5. Further, an operation signal is generated after the first reference time interval $T_{LB1}$ ending to represent a hit-movement being started.

Further, step 54 is processed and the gesture-operation unit 14 determines if the object 2 touches the touch device 3 the second time within the second reference time interval $T_{LB2}$ according to the result detected by the touch-detect unit 13 within the second reference time interval $T_{LB2}$. Under the circumferences, the preceding operation signal, which represents the hit-movement being started, is maintained in the second reference time interval $T_{LB2}$.

If another touch of the object 2 on the touch device 3 is not operated within the second reference time interval $T_{LB2}$, step 55 is processed and the operation signal is ceased at the time of the second reference time interval $T_{LB2}$ ending and it represent the termination of a hit-movement for completing a single tap.

It is noted that although the gesture-operation unit 14 sending out the operation signal represents the single tap, the integral determination done by the gesture-operation unit 14 is based on all the movements of the object 2 on the touch device 3 within the first reference time interval $T_{LB1}$ and the second reference time interval $T_{LB2}$. Hence, if the touch-detect unit 13 has detected other touch signals (the detected result is "YES" in step 54) within the second reference time interval $T_{LB2}$, the preceding operation signal is changed to the double taps which are processed with step 56 or the drag which is, processed with step 57.

Step 56 in company with FIG. 5 shows the gesture-operation unit 14 determines another touch of the object 2 on the touch device 3 being conducted within the second reference time interval $T_{LB2}$ and then leaving. Thus, the operation signal is ceased at the time of the second reference time interval $T_{LB2}$ ending for representing a hit-movement being terminated and then another operation signal is generated and terminated to represent the start and the stop of another touch for completing the double taps.

Another situation extending from the detected result being "YES" in step 54 is shown in step 57 in company with FIG. 7. The gesture-operation unit 14 determines another touch of the object 2 on the touch device 3 within the second reference time interval $T_{LB2}$ and then keeping the second touch temporarily without leaving before the second reference time interval $T_{LB2}$ ending. Thus, the operation signal is generated continuously from the second reference time interval $T_{LB2}$ ending till the detected second touch of the object 2 on the touch device 3 terminating such that the drag is completed.

It is appreciated that a method for identifying a single tap, double taps and a drag and a controller employing the method according to the present invention has the following advantages:

(1) Comparing to the prior art of the first mentioned cited references, the method and the controller of the present invention are capable of identifying the single tap, the double taps and the drag simply without an arrangement of multiple counters such that less complicated circuit design can be obtained to lower the fabrication cost effectively.

(2) Comparing to the prior art of the second mentioned cited references, if the detection time interval $T_{detect}$ keeps the same, the method and controller of the present invention for identifying the single tap can provide the operation signal for allowing the timing of the second reference time interval $T_{LB2\ being}$ earlier than the prior art of the second mentioned cited references does.

(3) Comparing to the prior art of the second mentioned cited references, if the detection time interval $T_{detect}$ keeps the same, the method and controller of the present invention for identifying the double taps can send out the first operation signal $T_{LB2}$ earlier than the prior art of the second mentioned cited references does such that the time for sending the signal is significantly reduced.

(4) Comparing to the prior art of the second mentioned cited references, if the detection time interval $T_{detect}$ keeps the same, the method and controller of the present invention for identifying the drag allows the first reference time interval $T_{LB1\ being}$ earlier than the prior art of the second mentioned cited references does.

(5) It can be understood that it is advantageous from the preceding advantages (2), (3) and (4) that the method and controller of the present invention enhance the response speed for operating the touch device 3.

While the invention has been described with referencing to preferred embodiments thereof, it is to be understood that modifications or variations may be easily made without departing from the spirit of this invention which is defined by the appended claims.

What is claimed is:

1. A method for identifying a single tap during an object contacting a touch device comprising following steps:
    (a) detecting when said touch device is touched by a first hit-movement conducted by said object;

(b) measuring time starting when the touch device is touched by the first hit-movement;

(c) detecting when said first hit-movement leaves said touch device, and comparing an amount of time starting from when the touch device is touched by the first hit-movement and ending when the first hit-movement leaves said touch device with a first reference time interval, the first reference time interval being a predetermined time duration measured starting when the touch device is touched by the first hit-movement;

(d) generating an operation signal corresponding to the touch and the leave of the first hit-movement upon completion of the first reference time interval when the first hit-movement leaves said touch device before completion of the first reference time interval;

(e) detecting if a second hit-movement is conducted by said object to touch said touch device within a second reference time interval, and maintaining said operation signal during the second reference time interval, the second reference time interval being a predetermined time duration measured starting upon completion of the first reference time interval;

(f) terminating said operation signal at an end of said second reference time interval when no second hit-movement is conducted by said object for touching said touch device within the second reference time interval.

2. A controller, which is capable of identifying a single tap of an object on a touch device, comprising:
    a touch-detect unit detecting a first hit-movement and a second hit-movement conducted by said object to touch and leave said touch device;
    a gesture-operation unit, which connects with the touch-detect unit, further comprising a built-in identifying logic which utilizes a first reference time interval and a second reference time interval, the first reference time interval being a predetermined time duration measured starting when the touch device is touched by the first hit-movement and the second reference time interval being a predetermined time duration measured starting upon completion of the first reference time interval;
    a timer unit being connected to the gesture-operation unit to measure time when the touch device is touched by the first hit-movement;
    wherein the gesture-operation unit generates an operation signal at an end of the first reference time interval corresponding to the touch and the leave of the fist hit-movement when the leave of said first hit-movement is detected before completion of the first reference time interval, maintains said operation signal during the second reference time interval, and terminates said operation signal at an end of said second reference time interval when no second hit-movement occurs within said second reference time interval.

3. A method for identifying double taps during an object contacting a touch device comprising following steps:
    (a) detecting when said touch device is touched by a first hit-movement conducted by said object to touch said touch device;
    (b) measuring time starting when the touch device is touched by the first hit-movement;
    (c) detecting when said first hit-movement leaves said touch device, and comparing an amount of time starting from when the touch device is touched by the first hit-movement and ending when the first hit-movement leaves said touch device with a first reference time interval, the first reference time interval being a predetermined time duration measured starting when the touch device is touched by the first hit-movement;
    (d) generating a first operation signal corresponding to the touch and the leave of the first hit-movement upon completion of the first reference time interval when the first hit-movement leaves said touch device before completion of the first reference time interval;
    (e) detecting if a second hit-movement is conducted by said object to touch and then leave said touch device within a second reference time interval, the second reference time interval being a predetermined time duration measured starting upon completion of the first reference time interval;
    (f) terminating said first operation signal at an end of said second reference time interval when the second hit-movement is detected within the second reference time interval; and
    (g) generating a second operation signal and then terminating said second operation signal corresponding to the touch and the leave of said second hit-movement respectively for completing said double taps.

4. A controller, which is capable of identifying double taps of an object on a touch device, comprising:
    a touch-detect unit detecting a first hit-movement and a second hit-movement conducted by said object to touch and leave said touch device;
    a gesture-operation unit, which connects with the touch-detect unit, further comprising a built-in identifying logic which utilizes a first reference time interval and a second reference time interval, the first reference time interval being a predetermined time duration measured starting when the touch device is touched by the first hit-movement and the second reference time interval being a predetermined time duration measured starting upon completion of the first reference time interval;
    a timer unit being connected to the gesture-operation unit to measure time when the touch device is touched by the first hit-movement;
    wherein the gesture-operation unit generates a first operation signal at the end of the first reference time interval corresponding the touch of the first hit-movement when the leave of said first hit-movement is detected before completion of the first reference time interval, terminates said first operation signal at an end of the second reference time interval when the second hit-movement is detected within said second reference time interval, and generates and terminates a second operation signal corresponding to a beginning and an end of said second hit-movement for completing said double taps.

5. A method for identifying a drag during an object contacting a touch device comprising following steps:
    (a) detecting when a first hit-movement is conducted by said object to touch said touch device ;
    (b) measuring time starting when the touch device is touched by the first hit-movement;
    (c) detecting when said first hit-movement leaves said touch device, and comparing an amount of time starting from when the touch device is touched by the first hit-movement and ending when the first hit-movement leaves said touch device with a first reference time interval, the first reference time interval being a predetermined time duration measured starting when the touch device is touched by the first hit-movement;
    (d) generating a first operation signal corresponding to the touch and the leave of said first hit-movement upon completion of the first reference time interval when the first hit-movement leaves said touch device before completion of the first reference time interval;

(e) detecting if a second hit-movement is conducted by said object to touch and then leave said touch device within a second reference time interval, the second reference time interval being a predetermined time duration measured starting upon completion of the first reference time interval;

(f) generating a second operation signal from an end of the second reference time interval till said second hit-movement stopping for completing said drag when a detected result of step (e) is that the second hit-movement occurs without stopping.

6. A controller, which is capable of identifying a drag of an object on a touch device, comprising:
   a touch-detect unit detecting when a first hit-movement and a second hit-movement are conducted by said object to touch and leave said touch device;
   a gesture-operation unit, which connects with the touch-detect unit, further comprising a built-in identifying logic which utilizes a first reference time interval and a second reference time interval, the first reference time interval being a predetermined time duration measured starting when the touch device is touched by the first hit-movement and the second reference time interval being a predetermined time duration measured starting upon completion of the first reference time interval;
   a timer unit being connected to the gesture-operation unit to measure time when the touch device is touched by the first hit-movement;
   wherein the gesture-operation unit generates a first operation signal at an end of the first reference time interval corresponding to the touch and the leave when the leave of said first hit-movement is detected before completion of the first reference time interval, determines the second hit-movement occurs within the second reference time interval without stopping, and generates a second operation signal from an end of said second reference time interval till said second hit-movement stopping for completing said drag.

* * * * *